June 8, 1954
M. E. STECZYNSKI
2,680,301
PIPE THREAD GAUGE
Filed Feb. 18, 1950
2 Sheets-Sheet 1
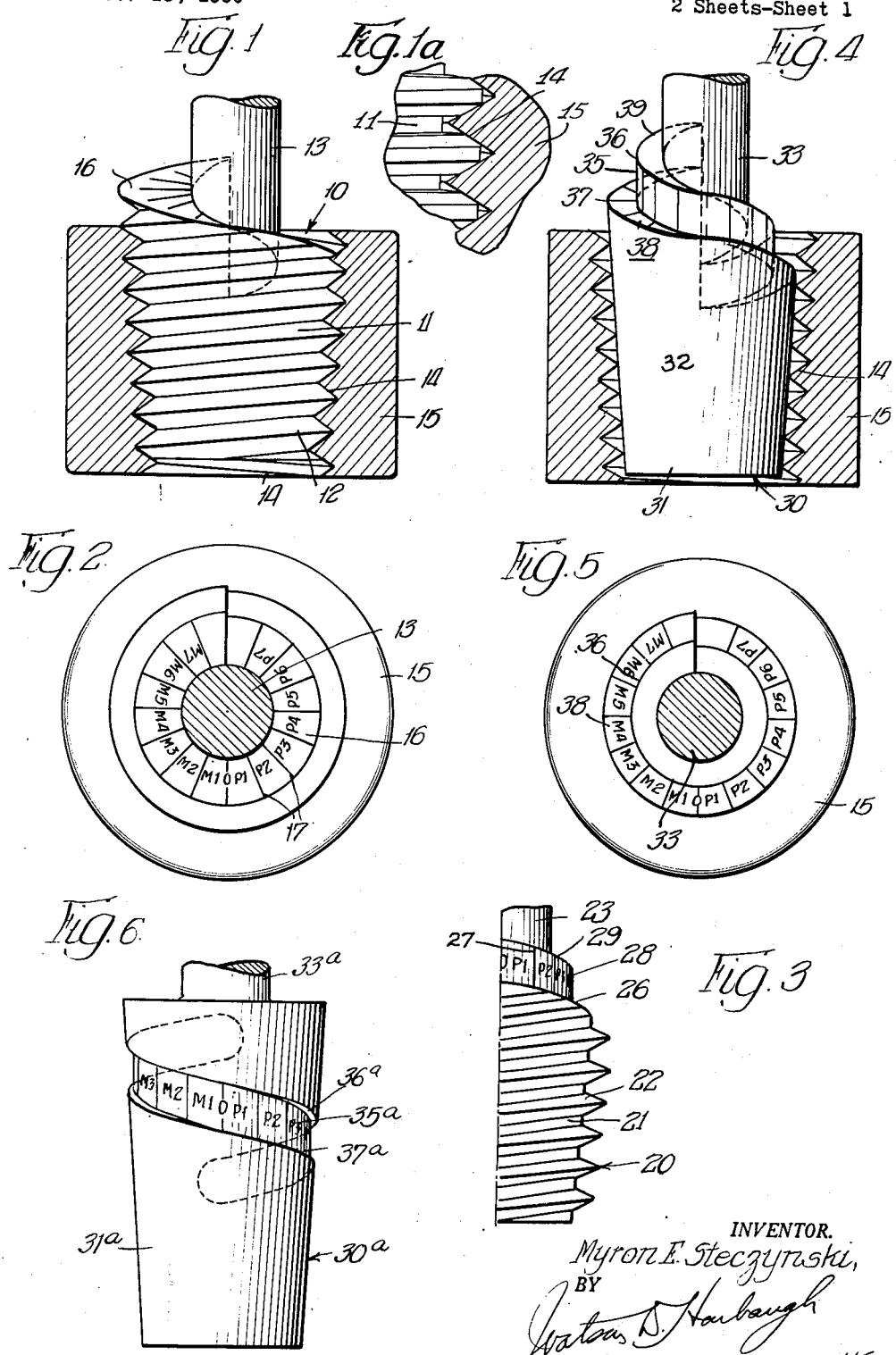
INVENTOR.
Myron E. Steczynski,
BY June 8, 1954 — M. E. STECZYNSKI — 2,680,301
PIPE THREAD GAUGE
Filed Feb. 18, 1950 — 2 Sheets-Sheet 2
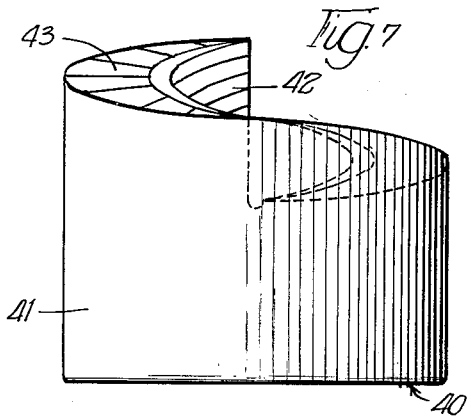
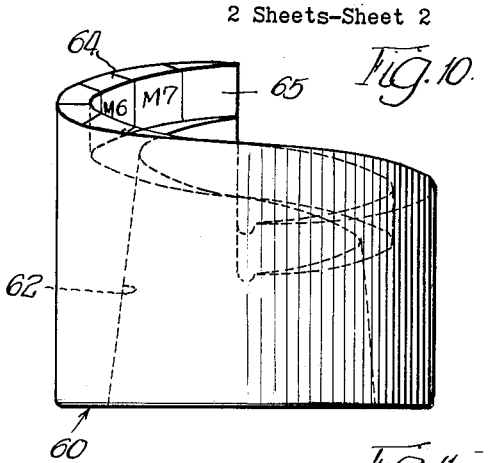
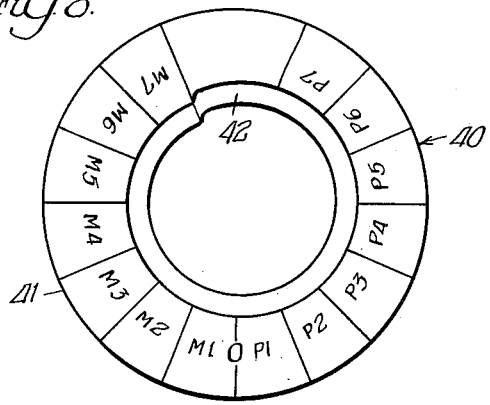
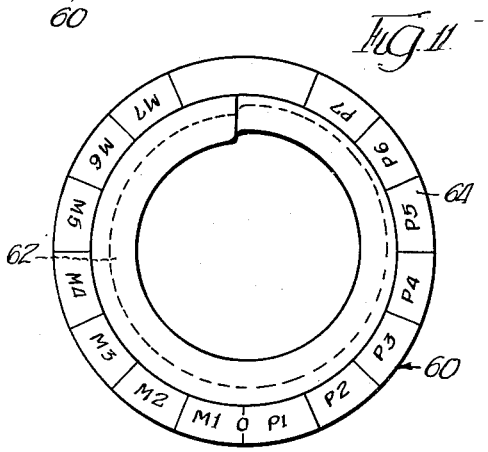
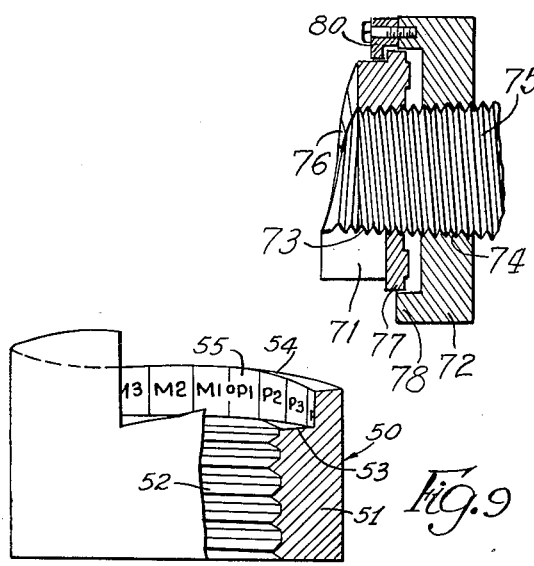
INVENTOR.
Myron E. Steczynski Patented June 8, 1954

2,680,301

UNITED STATES PATENT OFFICE 2,680,301

PIPE THREAD GAUGE

Myron E. Steczynski, Chicago, Ill.

Application February 18, 1950, Serial No. 144,869

17 Claims. (Cl. 33—199)

This invention relates generally to gauges and more particularly to an improved procedure and gauge sets for gauging male and female tapered pipe threads.

Mating pipe threads, because they must effect a liquid or gas-tight seal, must make sealing contact with each other at both the root and the crest of the thread as well as at the intermediate side portions. To aid in effecting the seal almost all pipe threads are tapered so that the threads are forced into sealing contact when the threaded elements are tightened together throughout a major portion of their length.

To seal the root and crest portions of the thread the usual procedure has been to employ a luting compound which fills these spaces when the elements are threaded together. However, luting compounds are not satisfactory as where high temperatures and pressures are involved, or where considerable vibration is to be encountered, or where the fluid either affects the luting compound or is of such nature as to be contaminated thereby.

For use in such cases, threads such as the NPTF (Dryseal) have been developed in which the roots and crests of mating threads make positive and substantially coincident metal-to-metal contact. In the "Dryseal" thread the thread crest is purposely made sharper than the mating root so that the root actually flattens the crest when the joint is tightened to form a seal. In this "Dryseal" thread, much closer tolerances at the crests and roots should be observed, but heretofore no effective means or method has been available.

The development and adaptation of metal-to-meal sealing threads has been impeded because the gauging methods and gauges which were suitable to standard pipe threads are not adapted to provide close fit threads in which the root and crest forms are critical.

The gauges of this invention may be used with considerable advantage in gauging conventional pipe threads, but they are particularly well adapted for the newer metal-to-metal contact threads, for an accurate indication of root and crest condition as related to the sides of the thread is achieved with these gauges and can be accomplished by unskilled personnel who are able to follow the most simple instructions.

In gauging pipe threads the fullness of the root, or root truncation, as well as the flatness of the crest, or crest truncation, are critical values and must bear the proper relationship to the pitch diameter along the entire mating length of the thread. In other words, the profile of the thread should be the same over its entire length and it should have a predetermined shape with respect to the profile of the mating thread.

The fact that pipe threads are tapered makes determination of the root and crest shapes or truncation measurement difficult because both the root and crest of a tapered thread define cones, and a direct measurement of a diameter is of no value unless it is made at the same point as measurements of other diameters. Thus accurate gaging of tapered pipe threads must involve a correlation between the minor diameter, the pitch diameter and the major diameter of the thread at any particular point and at all points along its length. Actually the term "diameter" used in connection with taper pipe threads is somewhat of a misnomer. Radius would be more apt, for the radii of a diametral line are not exactly the same since a root is always directly opposite a crest, and corresponding measurements on opposite sides of the tool axis are slightly displaced axially on a conical figure. Furthermore the sides are not the same from root to crest. The term "diameter," however, will be used herein, for it is the accepted term, having been carried over from non-tapering screw thread terminology where all diameters are constant over the length of the thread.

The conventional method of gauging "Dryseal" threads has been to employ a set of three plugs or rings, depending upon whether a male or female thread is to be gauged. The first plug or ring gauge checks the end portion of the thread with respect to a particular pitch diameter to determine whether the basic pitch diameter is correct and spaced from the end of the thread within limits of one turn in either direction, three stepped markings usually being provided on the gauge to show the depth of hand engagement of the gauge and thread. The second gauge is like the first but is of such size as to gauge the three wrenching threads beyond those engaged by the first gauge. Steps may also be provided to indicate whether the pitch diameters of these threads are oversize or undersize. This gauge should engage within one-half turn of the first gauge if the thread is correct. The third gauge has an unthreaded conical surface which engages only the crest of the thread, and three sets of two indicating markings are provided which show the basic as well as the limiting diameters of the thread crest. The choice of crest diameter limits is determined by referring back to the original measurement and the proper pair of limit steps which corresponds to first reading of the pitch diameter at hand engagement. These are difficult operations because no provision for direct reading is provided. Everything is based upon interpolation of word markings. Suppose, for example, that the first gauge indicates that the critical pitch diameter of the thread is one-half turn small from basic. The inspector then has to decide which of the pairs of steps on the last gauge is to be employed as limits. He has a choice between the pair which corresponds to basic threads or the pair which applies to minimum size threads. The human factor in such a procedure is too variable to give reliable results. Some bad threads are passed and some good threads are rejected.

Furthermore, no adequate determination of the root condition is possible by the above outlined procedure and no means of gauging such has been provided heretofore.

Other arrangements for gauging such threads, such as the projection method where a shadow of the thread form is compared with a standard profile, are cumbersome to use and are subject to error in not catching irregularities shielded from view or not brought into the viewing plane. For further discussion of this subject matter reference and incorporation herein is made to my article "Tighter Pipe Threads through Proper Gaging," published in the 33rd Annual Report of the Compressed Gas Manufacturers Association, page 72.

Accordingly, one object of this invention is to provide a set of gauges and method for gauging tapered pipe threads which check not only the sides of the thread to be gauged but also in direct relationship therewith the root and the crest thereof to determine whether the significant thread characteristics are correct to form an acceptable seal.

Another object is to provide a gauging apparatus which in direct relationship with exact positions takes into account the fact that a thread whose effective pitch diameter or side portions are oversized or undersized should also have uniformly and standard oversized or undersized root and crest diameters respectively in order to provide proper thread form for sealing.

Another object is to provide a gauging apparatus which will give a ready indication of any critical thread defect and degree thereof in the case of unacceptable threads so that the piece may be either scrapped or earmarked for reworking, and which may be used to classify acceptable threads as to basic pitch diameter for later use with mating threads having the same effective pitch diameter.

Another object is to provide sets of gauges which are simple and easy to use, requiring a minimum of human judgment in the gauging operation, and which can be readily and relatively inexpensively manufactured and maintained.

Another object is to provide a gauge for tapered threads which will readily indicate the exact position of the critical pitch diameter of the thread being gauged without the necessity of the operator keeping track of the number of turns of the gauge, the indicating means on the gauge extending the range to more than two turns of the thread, yet confining the operator to only one reading in any gauging position of the gauge.

A further object is to provide a gauge for determining the location of the basic pitch diameters of tapering threads by axial depth of threaded engagement, a surface on the end of the gauging element being inclined so as to indicate relative depth to which the threaded part is engaged in the full range and beyond of acceptable limits of the thread.

A further object is to provide a gauge having a continuous indicating surface which may be readily reworked by machining a portion away to accommodate for wear of the gauging thread.

A further object of the invention is to provide a taper thread gauge construction in which the gauge can be easily provided with a characteristic gauging element for specific gauge purposes, and any point on a continuous scale thereon can be selected and marked by symbol as the basic criterion for the position of the proper thread diameter in the thread to be gauged without further work being done on the gauging element.

Another object of the invention is to provide a gauge construction in which the waste due to rejects in gauge manufacturing is eliminated.

Another object of the invention is to provide a gauge construction whereby a damaged or worn gauge need only have the gauging element reworked and the basic zero point can merely be shifted on a continuous scale as by renewing decalcomania markings on the scale surface with the zero point slightly shifted accordingly.

Another object of the invention is to provide a taper thread gauge in which no tolerance for wear need be provided between the function and the reading of the gauge, but the indicating scale can be shifted or renewed at different points from time to time as the gauge wears.

Other objects and advantages of this invention will present themselves to those familiar with the art on reading the following specification in conjunction with the drawings and the appended claims:

A fundamental idea of this invention is to provide a set of gauges for each thread to be gauged, one gauge of the set engaging the sides of the thread at approximately the pitch diameter to determine the basic pitch diameter of the thread which in taper threads is a function of the distance the gauge may be threaded onto the workpiece, or vice versa. A scale is provided which gives a ready, convenient to remember, indication of the critical pitch diameter within one range of the scale of less than one turn for two or more relative turns of the thread. Another gauge of the set is constructed to engage only the root portion of the thread and is provided with a pair of axially spaced scale margins which indicate at a glance the tolerance in critical root diameter position corresponding to pitch diameter readings appearing on the first gauge. A further gauge in the set is constructed to engage only the crest portion of the thread and is provided with axially spaced scale margins to determine at a glance the critical crest diameter tolerance corresponding to readings appearing on the first gauge.

It appears that when a threaded joint is tightened, except in cases of extreme interference, the sides of the two threads will be in contact, and a gauging procedure wherein the crest and root diameters are referred back to the pitch diameter results in extremely accurate determination and fit because even the sets of gauges employed for male and female threads can be cross-checked for wear and deviations at any time according to specified stand-off limits.

In the drawings:

Fig. 1 is a side view of the basic pitch diameter plug gauge of a set constructed in accordance with this invention received in a female thread to be gauged;

Fig. 1a is an enlarged view, similar to Fig. 1, of a portion of the threads showing the undercutting thereof;

Fig. 2 is a top view of the plug gauge and piece of Fig. 1;

Fig. 3 is a side view of the second gauge of the set used for determining root truncation;

Fig. 4 is a side view of a form of the third gauge of the set used for determining crest truncation, the gauge being received in the workpiece thread;

Fig. 5 is a top view of the gauge and piece of Fig. 4;

Fig. 6 is a side view of a modification of the crest truncation gauge of the set;

Fig. 7 is a side view of a ring gauge for determining basic pitch diameter of male threads;

Fig. 8 is a top view of the gauge of Fig. 7;

Fig. 9 is a side view partly in vertical section, showing the second gauge of the set for determining root truncation;

Fig. 10 is a side view of the third gauge of the set used for determining crest truncation;

Fig. 11 is a top view of the gauge of Fig. 10;

Fig. 12 is a top view of a modified form of ring gauge embodying the principles of this invention; and Fig. 13 is a vertical section taken on line 13—13 of Fig. 12.

A set of three gauges for gauging tapered female threads is shown in Figs. 1 to 5. The first gauge 10 comprises a plug 11, having a tapered helical thread element 12 machined thereon, and a shank 13 which may be used to support the plug 11 in a conventional holder. The thread 12 differs in form from that of an ordinary pipe thread in that it is undercut at the root and relieved at the crest to provide ample clearance at these points so that the plug 11 will engage the thread 14 to be gauged essentially at its pitch diameter when the plug 11 is threaded into the workpiece 15.

The upper end of the plug 11 is machined to have a curving inclined surface 16 of one turn or less whose outer edge is similar to a helix of a lead greater than the pitch of the thread being gauged. In the embodiment shown, the overall pitch of this inclined surface is four times the pitch of the thread 12, but the degree of inclination can be varied throughout its length and be less over the critical range of one and one-half thread turns to provide a micrometer effect. Also, the shape of the surface 16 is not critical for it may be pitched at a different angle, if desired, to lessen the length thereof to less than one turn, but four times the thread pitch for one turn has been found to be quite convenient for most applications.

The purpose of the surface 16 is to give a ready indication of the depth the plug 11 has been received into the thread 14. To provide this indication, a series of circumferentially spaced marks 17 and indicia which indicate varying distances of depth are provided upon the surface 16. In the embodiment illustrated the marks 17 are so spaced that each division represents one-quarter turn of the gauge 10 into the workpiece, and, as shown, the incline of the surface 16 is uniform and the spacing of the marks also uniform.

The gauge is preferably constructed and calibrated so that an intermediate space on the sloping surface 16 is level with the mouth of a threaded hole which has the proper basic pitch diameter when the plug 11 is received to a hand-tight position therein. For convenience, this space is designated O, and those lower on the curve are designated P1, P2, P3, etc., while those higher are designated M1, M2, M3, etc., the letters P and M standing for "plus" and "minus" and the numerals designating the number of quarter revolutions of the gauge 10 in the thread 14. Thus for each different basic pitch diameter, measured by quarter revolutions of the gauge up to four complete turns, a designated sector or area on the surface 16 is provided in the embodiment illustrated. If the limits of acceptability of the thread are such that it may vary one turn in either direction from the specified basic pitch diameter, the limits on the scale would extend from the center of the area designated M4 to the center of the area P4.

Accordingly, the primary function of the gauge 10 is to determine if the thread 14 is within tolerance limits in so far as the basic pitch diameter is concerned, and to give an easy-to-remember designation or reference standard by which to determine the basic pitch diameter depth of the thread.

It will be obvious at this point that a continuous scale instead of designated areas can be provided on the surface 16 as the reference criteria in a uniform system of graduation used on all the gauges of the set. If desired, the surface 16 may be a series of steps, each step designating a different pitch diameter, but this does not permit the operator to make ready fractional interpolations to assist in greater accuracy.

The second gauge 20 of the set in Fig. 3 is similar in overall appearance and construction to the gauge 10, comprising a threaded plug 21 and a supporting shank 23. The form of the thread 22, however, is such that it engages only the root of the thread 14 to be gauged when received therein, the angle of the thread 22 being sharper than that of the thread 14 gauged and the root of the thread 22 being substantially undercut so as to clear the crest of the thread 14 gauged.

Instead of a helical surface at the top of the plug 21 a pair of stepped surfaces 26 and 29 are provided which define a cylindrical area 28 bounded by two helices. This axially defined area 28 is graduated by a series of axial lines 27 which correspond to the lines 17 in the first gauge, and the designation of the areas defined by the lines is the same as that of the first gauge. The height of the area 28 is preferably constant and it corresponds to the tolerance in root truncation permissible in the thread to be gauged.

To use this gauge, the operator simply threads it into the workpiece 15 until hand-tight and then refers to the area on the surface 28 corresponding to the effective pitch diameter position indicated by the first gauge 10. Thus if the pitch diameter were plus a one-half turn, the gauge 10 would designate the area P2, and the operator would refer to the area P2 on the second gauge 20. If the plane defined by the top surface of the workpiece intersected the area P2 at any point between the axially spaced boundaries the depth of the root of the thread would be satisfactory. On the other hand, if the plane did not intersect this area, but was beyond the axially spaced boundaries of that particular area, the thread should be rejected and earmarked for reworking, if possible, or for scrapping.

In the event that a graduated scale arrangement is employed on the first gauge 10 and the second gauge 20, the inspector would merely refer to the vertical line on the surface 28 which corresponded to the scale reading on the gauge 10, and the ends or boundaries of this line defined by the helices 26 and 29 would designate the limits of acceptability. From the foregoing it will be apparent that the vertical distance between the helices 26 and 29 corresponds to the root truncation tolerance at the various positions on the gauge corresponding to the identification of the root diameter positions for various workpieces being gauged.

In order to simplify the drawings, no chip grooves have been shown in any of the gauges. Actually it is preferred to provide two or more conventional chip grooves in all of the threaded gauges in order to reduce the possibility of interference from loose chips which may be present. This is particularly true where the gauges are to be used in the shop as work gauges instead of for final inspection only. The ruggedness of the gauges of this invention makes them particularly well suited for this purpose.

Two forms of the third gauge of the set for gauging the thread crest are illustrated in Figs. 4 to 6 of the drawings. For most purposes the form shown in Fig. 6 is preferred, but the form of Fig. 4 is more similar to the root gauge 20, and its indicating surface may be machined with the same tooling setup as that of the gauge 20, if desired.

The gauge 30 (Fig. 4) comprises a plug 31 and a shank 33 similar to the first two gauges 10 and 20. The surface 32 of the plug 31 is machined so as to be truly conical, having the taper which the crests of the thread 14 should define to be acceptable. The upper end of the plug 31 is machined the same as the top of the plug 21 to have a cylindrical surface 35 thereon bounded by two helices 36 and 37. The surface 35 is the tolerance indicating surface the same as the surface 28 in the second gauge, and the area designations may be marked on this surface or upon either of the surfaces 38 or 39, if desired. Regardless of which surface bears the indicia, however, the tolerance limits are defined by the helices bounding the surface 35.

To use this gauge and determine the condition of crest truncation, the inspector merely inserts the plug 31 in the threaded hole 14 until it is hand tight. Any deviation of the hole 14 will be indicated by the fact that the plug will be free to wobble from side to side in the hole 14. The depth of the plug which is received in the hole 14 is directly proportional to the crest diameter of the thread 14. Thus to gauge the crest of thread 14, the operator merely refers to the designated area on the surface 35 which corresponds to the indicated pitch diameter of the thread 14 determined by the first gauge 10 and checks to see whether the surface defined by the top of the workpiece 15 intersects this area. This is readily done both with this gauge 30 and the second gauge 20 by turning the workpiece 15 sidewise and sighting along the surface.

The preferred form of the third gauge 30a shown in Fig. 6 is essentially the same as that described above, like parts bearing like numerals followed by the letter "a" in the preferred form. The principal difference is that the indicating surface 35a is cut into the side of the conical plug 31a instead of the top thereof where it can be more closely associated with the workpiece being gauged. In the event that the area 35a is small in size, the indicia may be applied to the plug 31a above the line 36a, the upper portion being relieved so as not to engage the thread and be subject to scratching or wear.

The manner in which the set of three gauges 10, 20 and 30 is used to gauge a thread is probably apparent from the foregoing description, but the following résumé may prove helpful.

The first step is to thread the gauge 10 into the thread 14 to be gauged, turning the gauge down until it is hand tight. The point where the surface of the work intersects the helical surface 16 is then noted to determine if the critical pitch diameter is between limits and to secure an estimation of its value. The inspector notes which of the indicated areas on the surface 16 intersects the work surface, having only to remember a simple designation such as P2, or M3, etc.

He then removes the gauge 10 and employs either of the other two gauges for the second determination. The order is not important. But, assuming he next employs the root gauge 20, he threads this gauge into the hole 14 until it is hand tight and checks the area on the surface 28 bearing the designation previously determined to see if the plane defined by the top of the workpiece 15 comes within the axial boundaries of such designated area. If it does, the root truncation of the thread is within proper limits.

Lastly, the gauge 30 is inserted in the hole 14 to check crest truncation, the inspector again referring to the area designated by the critical pitch measurement and checking to see if the top plane intersects it.

Thus the thread 14 is fully gauged for pitch diameter, and both root and crest truncations.

To gauge male pipe threads, a similar set of three gauges 40, 50 and 60 is employed, the three gauges being in the form of rings instead of plugs to accommodate the male thread.

The first gauge 40 of the set is shown in Figs. 7 and 8 and comprises a hollow cylindrical ring 41 having an internal tapered thread 42. This thread, like the thread 12 of the first described gauge 10, is undercut at the root and relieved at the crest so as to engage only the sides of the thread to be gauged substantially at the pitch diameter. The small end of the thread is at the top of the gauge 40 as viewed in Fig. 7 so that the workpiece is threaded into the gauge from the bottom.

The top surface of the gauge 40 is machined to a helical shape, the pitch of the helix being preferably four times the thread pitch as in the gauge 10. The resulting surface is inscribed to have labeled areas thereon corresponding to the effective pitch diameter of the threads to be gauged, as shown in Fig. 8.

This gauge is read by threading it onto the workpiece until it is hand tight, at which time the work will partially project at the helix of the gauge. The effective pitch diameter is then checked by noting the point or area on the helical surface 43 which is level with the top of the workpiece. If the area designated P1 is level with the top of the piece, the pitch diameter is within one-quarter turn on the large side of being correct, while if any other area is level with the end of the piece, the pitch diameter is greater or smaller and the magnitude and direction of the error is readily apparent. Just as in the first described gauge the numerals in the area designations denote the number of quarter turns deviation from zero, the letter P designating plus and the letter M, minus.

The gauge 50 shown in Fig. 9 is used to check the effective root diameter or root truncation of the thread. This gauge 50 comprises a hollow cylinder 51 having an internal tapered thread 52. The form of the thread 52 is similar to that of the thread 22 of the gauge shown in Fig. 3, the sides being relieved and root undercut so that the root of the thread to be gauged is engaged when the gauge 50 is threaded onto the workpiece.

The top surface of the gauge 50 is machined so as to have two inclined surfaces 53 and 54 thereon whose edges define helices which represent the limits of root truncation. These surfaces are connected by a cylindrical surface 55 whose axial height indicates the root tolerance of the specified thread.

The gauge 50 is used to check the root truncation by simply threading it onto the work and noting whether the plane defined by the top of the workpiece intersects the area on the surface 55 whose indicia correspond to the area determined by the pitch diameter gauge 40. If it does, the root truncation is acceptable—if not, the part should be reworked or rejected.

The gauge 60 for checking crest truncation is shown in Figs. 10 and 11. This gauge, like the gauge 30, has a conical surface 62 therein instead of a thread, and the conical surface engages the crest of the thread to be gauged when slipped onto the workpiece. Deviations in the crest of the thread may be readily detected by attempting to wobble the gauge 60 as in the case of the gauge 30.

The top of the gauge 60 is machined to provide the same construction as the gauge 50, such as two inclined surfaces 63 and 64 separated by a cylindrical surface 65. The surface 65 preferably has scribed lines and indicia thereon corresponding to the pitch diameter indications as shown in Fig. 10, or, if desired, the markings may be placed upon other surfaces as desired. This is also true of the gauge 50, for the function of the indicating surfaces is the same in the two gauges.

The gauge 60 is used to check crest truncation by slipping it over the workpiece and checking to see if the end of the piece comes axially within the limits as represented by the two helices at the point as determined by the gauge 40.

The procedure for using the set of gauges for male threads is similar to that for using the plug gauges 10, 20 and 30 and need not be described at length herein.

It should be apparent from the foregoing description that different schemes of calibration may be used on the indicating surfaces and that the procedure of gauging is basically the same regardless of what scale markings are used. It is preferred, however, to employ simply designated areas rather than continuous scales, for the simple designations can be easily remembered from one gauging operation to the next and provide complete accuracy for most determinations. It will also be apparent that for all of the gauges described herein an arrangement wherein each of the P and M divisions was a separate step instead of gradually sloping indicating surfaces could be used. The sloping helical surfaces are much simpler to machine, however, and permit accurate fractional interpolations when necessary.

Another modification of this invention is illustrated in Fig. 12. The purpose of this gauge 70 is to combine the ring gauges 40 and 50 in a single gauge to speed the gauging operation by making it necessary to thread the workpiece into only a single gauge.

The gauge 70 comprises a pair of circular rings 71 and 72 having internal threads 73 and 74 respectively. The smaller ring 71 gauges basic pitch diameter and the thread 73 is undercut and relieved so as to engage only the sides of the thread 75 to be gauged. The thread 74 on the other ring 72 is relieved at the sides so that it engages only the root of the thread 75 to be gauged.

One face of the ring 71 is machined to have an inclined surface 76 similar to that on the gauge 40 for indicating the location of the basic pitch diameter of the gauged thread 75. This surface 76 is preferably graduated the same as that of the gauge 40 to show basic pitch diameter location. On the side of the ring 71 a flange 77 is provided which serves not only as a retainer to hold the two gauge rings 71 and 72 together but also as a surface for indicating the root truncation tolerance.

The ring 72 has an integral projecting rim 78 having three circumferentially spaced lugs 80 attached thereto which project inwardly beyond the edge of the flange 77 to hold the two rings together. Actually, the gauge functions if the lugs 80 are eliminated, but they make it easier to handle the gauge.

The gauge 70 is used as follows: The workpiece thread 75 is first threaded into the larger ring 72 and given a few turns. The thread 75 then engages the thread 73 on the smaller ring and the two rings are rotated as a unit until such time as the thread 74 engages the root portion of the thread 75. The smaller ring 71 is then rotated until hand tight. In some instances the smaller ring 71 will come to a stop first, and the procedure is reversed, but in any event each ring is turned until snug.

The operator then looks at the end surface 76 on the smaller ring to determine whether the basic pitch diameter lies within the prescribed limits. The root truncation is checked by looking at the side of the gauge 70 along the edge of the rim 78. If this edge lies within the height of the flange 77 the root truncation is correct. Thus the height of the flange 77 corresponds to the root truncation tolerance, and if this tolerance is one-half a turn in either direction the height of the flange will be equal to the thread pitch. It will be obvious that a pair of scribed lines may be used to define the truncation tolerance instead of the height of the flange, if desired, as would be the case were the tolerance so small that the flange 78 would not have sufficient strength.

The same principle may be applied to a plug gauge for female pipe threads by providing two plugs, one of which is similar in construction to the gauge 40, being somewhat shorter, however, and having an axial bore. A second element, having a root engaging thread and a stem thereon which projects through the bore, is also provided. This plug engages the roots of two or three threads beyond the end of the first plug. A head on the stem holds the two plugs together and scribed lines on the side of the stem indicate root truncation tolerances.

It is preferred to use a crest truncation gauge such as the gauges 30 and 60 with either of the two dual purpose gauges described above to check the crest condition against the basic pitch diameter as indicated by the dual purpose gauges, but the use of the dual purpose gauges eliminates the necessity of threading the work into two separate gauges and speeds the gauging process.

Various changes and modifications in addition to those set forth herein may be made without departing from the spirit of this invention whose scope is commensurate with the following claims.

What is claimed is:

1. A set of gauges for gauging a taper thread comprising a gauge having a taper thread thereon undercut at the root and relieved at the crest so as to engage only the sides of a predetermined thread to be gauged, said gauge having an inclined surface at the end of the thread remote from that part of the gauge which first engages the work piece and a scale on said surface whereby the basic pitch diameter of the thread to be gauged is indicated, a second gauge having a taper thread thereon relieved at the sides and the root so as to engage only the root portion of said predetermined thread to be gauged, and a third gauge having a conical surface thereon for engaging the crest portions of said predetermined thread to be gauged, said second and third gauges having a pair of spaced spirally inclined surfaces at the end remote from that part of the gauge which first engages the work piece marked for indicating the truncation tolerances between them of said predetermined thread to be gauged for each increment upon said scale.

2. The set of claim 1, the gauges being in the form of plugs receivable in female taper threads.

3. The set of claim 1, the gauges being in the form of rings for receiving male tapered threads.

4. A set of gauges for gauging a taper thread comprising a gauge having a taper thread thereon undercut at the root and relieved at the crest so as to engage only the sides of a predetermined thread to be gauged, said gauge having means for indicating the basic pitch diameter of said predetermined thread to be gauged, a second gauge having a taper thread thereon relieved at the sides and the root so as to engage only the root portion of said predetermined thread to be gauged, and a third gauge having a conical surface thereon for engaging the crest portions of said predetermined thread to be gauged, said second and third gauges having a pair of spaced inclined surfaces at the end remote from that part of the gauge which first engages the work piece marked for indicating between them at predetermined places the truncation tolerances of said predetermined thread to be gauged in relationship to said indicating means.

5. The set of claim 4, the gauges being in the form of plugs receivable in female tapered threads.

6. The set of claim 4, the gauges being in the form of rings for receiving male tapered threads.

7. A set of gauges for gauging a taper thread comprising a gauge having a taper thread thereon undercut at the root and relieved at the crest so as to engage only the sides of a predetermined thread to be gauged, said gauge having means whereby the basic pitch diameter of said predetermined thread to be gauged is indicated, a second gauge having a taper thread thereon relieved at the sides and the root so as to engage only the root portion of said predetermined thread to be gauged, and a third gauge having a conical surface thereon for engaging the crest portions of said predetermined thread to be gauged, said second and third gauges having means defining a pair of axially spaced helical lines at the end remote from that part of the gauge which first engages the work piece for indicating the truncation tolerances of said predetermined thread to be gauged and indicia for indicating which portions of said helical lines correspond to the indicia of said indicating means relative to the basic pitch diameter of the thread being gauged.

8. The set of claim 7, the gauges being in the form of plugs receivable in female tapered threads.

9. The set of claim 7, the gauges being in the form of rings for receiving male tapered threads.

10. In a set of gauges for tapered pipe threads, a gauge comprising a body having a tapered thread thereon, a surface at the end of said body remote from that part of the gauge which first engages the work piece having an edge defining a helix, and indicia on said surface for indicating tolerance variations with respect to a predetermined pitch diameter of a predetermined thread being gauged.

11. The combination of claim 10, the helix having a pitch approximately four times the pitch of the thread.

12. In a set of gauges, a gauge comprising a ring having a tapered internal thread therein, said thread being undercut at the root and relieved at the crest to engage only the side portions of thread to be gauged, a surface at the end of said ring at the small end of the thread having an edge defining a helix, said helix having a pitch substantially in excess of the thread pitch, and indicia on said surface designating in one-quarter revolutions the variations from a basic pitch diameter of the thread being gauged.

13. In a set of gauges, a gauge comprising a ring having a tapered thread thereon, said thread being relieved to engage only the root of the thread to be gauged, a surface at the end of said ring at the small end of said thread having an edge defining a helix and a second surface also having an edge defining a second helix axially spaced from the first, said two surfaces bounding a third cylindrical surface, and indicia on one of said surfaces designating in one-quarter revolutions the variations from a basic pitch diameter of the thread being gauged, the helical edges of said cylindrical surface defining the applicable root truncation tolerance.

14. In a set of gauges, a guage comprising a body having a surface thereon for engaging only a characteristic portion of a tapered thread to be gauged, a cylindrical wall at the end of said body at the small end of said thread, a pair of walls defining axially spaced helices bounding said cylindrical wall to define a cylindrical surface on said wall, and indicia corresponding to the relative location of basic pitch diameters of predetermined threads being gauged for designating areas on the surface whose helical edges define the applicable truncation tolerance.

15. A set of gauges for gauging a taper thread including a basic pitch diameter gauge comprising a body having a tapered thread thereon undercut at the root and relieved at the crest to engage only the side portions of a predetermined thread to be gauged, said body having a surface proximate to the small end of the thread one of whose edges defines a helix having a pitch in excess of the thread pitch, and indicia on said surface for indicating the basic pitch diameter of predetermined threads mating with the gauge thread, a second gauge comprising a body having a tapered thread thereon undercut at the crest and relieved at the sides so as to engage only the root of said predetermined thread to be gauged, means defining a second surface bounded by two axially spaced helices at one end of said body proximate to the small end of said thread, and indicia on said second surface corresponding to the indicia on the first mentioned surface relative to the basic pitch diameter on the first mentioned gauge; and a third gauge comprising a body having a conical surface for engaging only the crest portions of said predetermined thread to be gauged, means defining a surface bounded by two axially spaced helices on said body proximate to the small end of the conical surface, and indicia on said last surface corresponding to the indicia on said first and second surfaces relative to the basic pitch diameter on the first mentioned gauge.

16. A set of gauges for gauging tapered pipe threads comprising a gauging element having means defining a cone contacting the intermediate side portions of a predetermined thread along a substantial portion of its length to determine the location of the basic pitch diameter of the thread, a second element having means defining a cone contacting only the root portions of said thread to determine the location of the basic root diameter of the thread, and a third gauging element having a conical surface for contacting only the crest portions of said thread to determine the location of the basic crest diameter, two of said elements having corresponding cooperating indices thereon indicating the limits of location of their respective basic diameters with respect to the basic diameter location determined by the other element.

17. A set of gauges for determining the degree of root and crest truncation of a tapered thread including a gauging element having surfaces thereon for engaging only the intermediate side portions of a predetermined thread to be gauged and having a helical wall portion defining a surface to indicate the relative location of basic pitch diameter portion of said thread, said helical wall portion having means thereon for readily indicating said location, a second element having a surface thereon defining a cone for engaging only the root portion of the thread to be gauged to determine the degree of root truncation, and a third element having a surface thereon defining a cone for engaging only the crest of the thread for determining the degree of crest truncation, said second and third elements having means thereon including helical walls axially spaced from each other a predetermined distance for indicating the limits of truncation toleerance for all acceptable basic pitch diameter locations.

References Cited in the file of this patent

UNITED STATES PATENTS

| Number | Name | Date |
|---|---|---|
| 1,602,645 | Buckingham | Oct. 12, 1926 |
| 2,339,699 | Husband | Jan. 18, 1944 |
| 2,387,814 | Straw | Oct. 30, 1945 |
| 2,487,677 | Steczynski | Nov. 8, 1949 |
| 2,561,759 | Steczynski | July 25, 1951 |

FOREIGN PATENTS

| Number | Country | Date |
|---|---|---|
| 35,122 | Sweden | July 9, 1913 |
| 275,875 | Great Britain | Aug. 18, 1927 |

OTHER REFERENCES

Pub., Sheffield Corp. Bulletin No. FL-1-45, received June 13, 1949, page 13. (Copy in 33-178B.)

Pub., Steczynski, "Tighter Pipe Threads Through Proper Gaging," Compressed Gas Manufacturer's Ass'n., 33rd annual report, Jan. 1946, pages 72-78. (Copy in 33-199.)

Pub., Nat'l Bur. of Standards "Supplement to Screw-Thread Standards for Federal Services 1944," June 1949, page 22. (Copy in 33-199.)

Pub., Michelon, Industrial Inspection Methods, rev. ed., Harper & Bros., 1950, pages 210-216.